United States Patent
Gooding, Jr.

[15] 3,685,397
[45] Aug. 22, 1972

[54] SWIVEL FITTING
[72] Inventor: Harley L. Gooding, Jr., Palatine, Ill.
[73] Assignee: Parker-Hannifin Corporation, Cleveland, Ohio
[22] Filed: Dec. 21, 1970
[21] Appl. No.: 99,735

[52] U.S. Cl. ................................92/106, 285/273
[51] Int. Cl. .............................................F01b 31/00
[58] Field of Search ...............285/272, 273; 92/106

[56] References Cited

UNITED STATES PATENTS

| | | |
|---|---|---|
| 3,020,057 | 2/1962 | Gamet.................92/106 X |
| 2,322,440 | 6/1943 | Highberg et al. ........92/106 X |
| 2,536,565 | 1/1951 | Ostergren.................92/106 |
| 2,568,092 | 9/1951 | Sloan et al..................92/106 |
| 2,679,233 | 5/1954 | Liaaen.....................92/106 X |
| 2,835,227 | 5/1958 | Gamet........................92/106 |

Primary Examiner—Martin P. Schwadron
Assistant Examiner—Leslie J. Payne
Attorney—Oberlin, Maky, Donnelly & Renner

[57] ABSTRACT

A pressure balanced swivel fitting characterized in that it employs simple squeeze type packing rings and plain ring bearings to retain the swivel fitting members together in axially interfitting relation and to support said members for relative rotation, the bearing rings being disposed in the fluid flow path so that the bearing surfaces are lubricated by flow of fluid through the swivel fitting, i.e., lubricant-laden air in the case of a pneumatic power system or hydraulic oil in the case of a hydraulic power system. The swivel fitting herein is further characterized in that it has interior drain chambers to prevent buildup of high pressure in the fitting in the event of leakage of the packing rings and moreover a low pressure packing ring is employed to prevent external leakage from the swivel fitting from one of said drain chambers.

19 Claims, 3 Drawing Figures

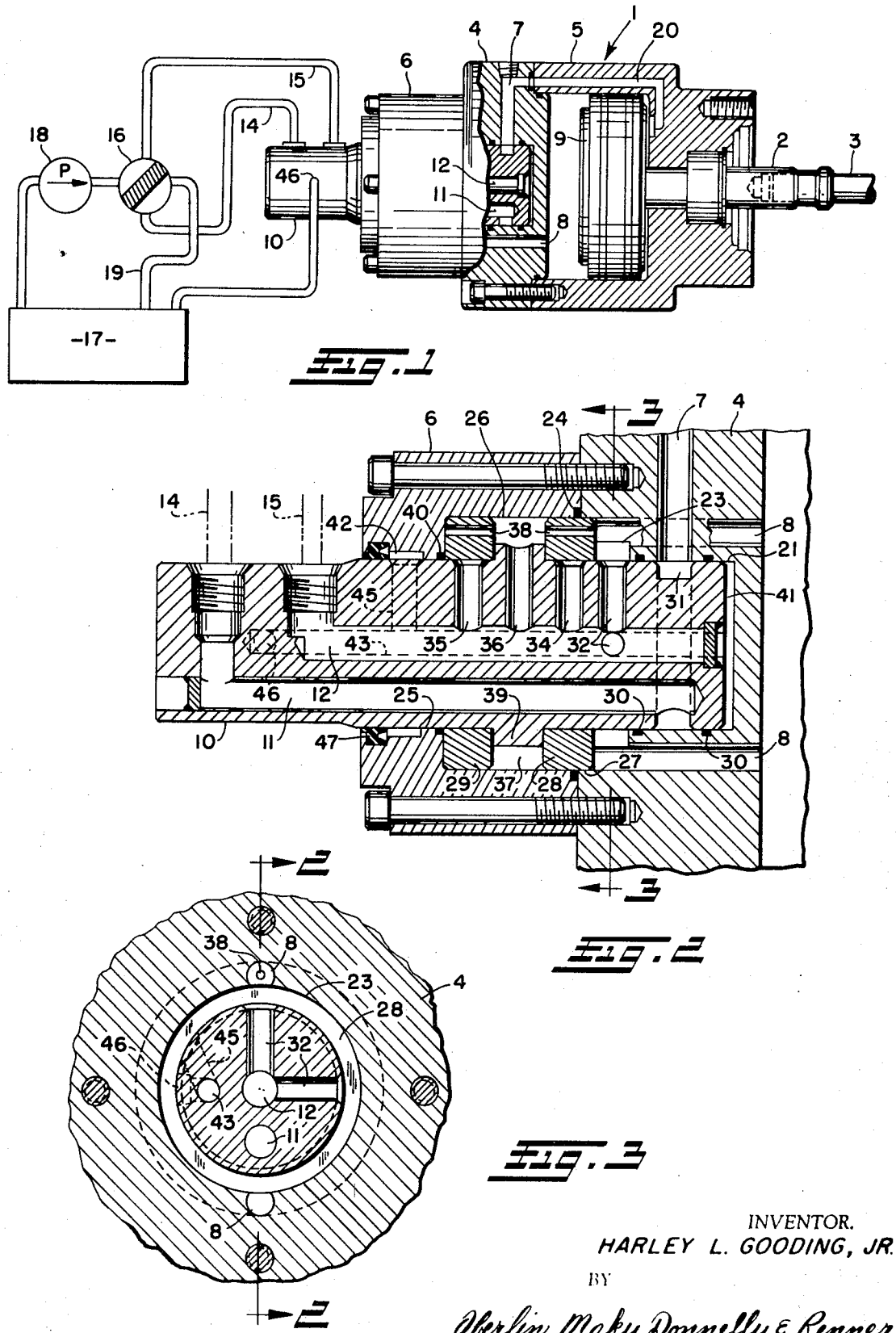

SWIVEL FITTING

BACKGROUND OF THE INVENTION

In conjunction with a rotating type linear actuator such as is used to actuate a rotating chuck on a turret lathe and the like it is known to provide a stationary distributor having a rotatable sealed connection with the actuator, fluid being conducted into and from the actuator via said distributor to move the piston in the actuator in opposite directions. Accordingly, the distributor and rotating cylinder form a swivel fitting but because known swivel fittings are not pressure balanced, substantial axial thrust loads are encountered and hence anti-friction bearings are usually employed. Also, complicated packing arrangements are required to seal the relatively rotating swivel parts including spring biased sealing rings, stacked chevron packings with supports and spreaders, adjustable packing glands, etc. Furthermore, in some instances as when ball bearings are employed as in a swivel fitting used in a pneumatic power system, grease fittings are provided on the swivel fitting for periodic bearing lubrication.

SUMMARY OF THE INVENTION

In contradistinction to the foregoing known swivel fittings, the present swivel fitting is of the pressure balanced type so that even in a high pressure fluid power system there is no axial thrust load tending to axially separate the swivel fitting parts and hence simple bearings rings may be employed to support the swivel fitting parts for relative rotation and to retain them axially together.

Furthermore, in the present swivel fitting the bearing rings aforesaid are disposed in the fluid flow path so that bearing surfaces are lubricated either by lubricant laden air in the case of a pneumatic power system, or by hydraulic oil in the case of a hydraulic power system.

A further characterizing feature of the present swivel fitting is that the aforesaid bearing rings are axially spaced apart to stably support the swivel fitting parts against cocking and to retain the parts axially together and furthermore, the bearing rings constitute pilots or locating means to coaxially position the fitting parts.

The swivel fitting herein also embodies intercommunicated low pressure drain chambers for leakage fluid to prevent buildup of pressure between the fitting parts which would impose axial thrust load thereon and embodies a low pressure packing ring between the parts which prevents external leakage of fluid from the drain chambers.

Yet another characterizing feature of the present invention is that it employs simple squeeze type packing rings, such as O-rings, contained in annular grooves as in the wall of the bore of one of the swivel fitting parts and furthermore, a simple form of V-type packing ring is used between the relatively rotating swivel fitting parts to prevent external leakage from a low pressure drain chamber thereadjacent, whereby no springs or complex multipart packing chamber parts are required.

Other objects and advantages of the present invention will appear hereinafter.

BRIEF DESCRIPTION OF THE DRAWING

FIG. 1 is a side elevation view partly in cross-section illustrating the swivel fitting herein as used in connection with a rotating type piston and cylinder actuator for a rotating chuck;

FIG. 2 is a fragmentary vertical cross-section view on an enlarged scale illustrating the swivel fitting in detail; and FIG. 3 is a transverse cross-section view taken substantially along the line 3—3, FIG. 2.

DETAILED DESCRIPTION OF THE INVENTION

In FIG. 1 the reference numeral 1 denotes a rotating type actuator which, for example, is adapted to be secured to the rear end of a rotating machine tool spindle with the piston rod 2 and drawbar 3 operatively secured to a rotating chuck secured at the front end of the spindle. In general, in the rotating actuator 1 used as aforesaid when the piston rod 2 is actuated to the left, as viewed in FIG. 1, the chuck operatively secured to the drawbar 3 will be actuated to grip a workpiece between the chuck jaws, and when the piston rod 2 is moved to the right the chuck jaws will be opened to release the workpiece.

The head 4 of the cylinder 5 and the tubular member 6 bolted to said head 4 constitute the swivel fitting housing providing passages 7 and 8 leading to the respective head and rod ends of the cylinder to actuate the piston 9 therein in opposite directions. The other swivel fitting part 10 is telescoped in the housing parts 4 and 6 and has two passages 11 and 12 therein which respectively register with the passages 7 and 8, and conduits 14 and 15 are connected to said swivel fitting part 10 for flow of fluid into and from said passages 11 and 12 under the control of a four-way reversing valve 16. In the case of a hydraulic actuator 1 there will be provided a reservoir 17 and a pump 18 which draws fluid from the reservoir 17 and discharges it under pressure to the valve 16 and the return fluid from the actuator 1 and swivel fitting part 10 is returned to the reservoir 17 via the conduit 19 also connected to said valve 16. As well known in the art, if the actuator 1 is a pneumatic actuator the pump 18 will be replaced by an air pressure supply line which has therein a lubricator for introducing lubricant mist into the air stream for lubricating the swivel fitting 10 and 4–6 and actuator 1.

Referring now in detail to FIGS. 2 and 3, the cylinder head 4 has a pair of passages 8 which lead into the head end of the cylinder 5 and a passage 7 which leads to the rod end of the cylinder 5 via a passage 20. The passage 7 leads to a bore 21 in the cylinder head 4 and the passages 8 intersect a counterbore 23 in said cylinder head 4.

The housing part 6 is bolted to the cylinder head 4 as shown, and the joint therebetween is sealed as by an O-ring 24, the housing part 6 having a bore 25 therethrough which is of the same diameter as the bore 21 in the cylinder head 4 and a counterbore 26 which is coaxial with another counterbore 27 in the cylinder head 4. These swivel housing parts, namely, the cylinder head 4 and the tubular part 6 are coaxially aligned by a bearing ring 28 which is a snug fit in both counterbores 26 and 27. Fitted into the counterbore 26 at the bottom thereof is another bearing ring 29 preferably identical with the first mentioned bearing ring 28 and axially spaced therefrom.

The male swivel fitting part 10 is of cylindrical form having an axially inner end portion which extends into the bore 21 of the housing part 4 and has sealed engagement with he O-rings 30 which straddle the passage 7 and the peripheral groove 31 which is intersected by the passage 11. Because the O-rings are of equal diameter when there is fluid under pressure in the passage 11, groove 31, and passage 7 leading to the rod end of the cylinder 5 there is no axial thrust load tending to axially separate the male swivel fitting part 10 from the female swivel fitting 4;6.

The swivel fitting part 10 has a central longitudinally extending passage 12 which leads to the counter bore 23 of the housing part 4 via a plurality of radial passages 32. The central passage 12 also has other radial passages 34, 35, and 36 which open to the ID of the respective bearing rings 28 and 29 and to the annular space 37 between the bearing rings 28 and 29. Each bearing ring 28 and 29 also has an orifice 38 therethrough for a purpose which will hereinafter appear. The swivel fitting part 10 has a thrust collar portion 39 between the bearing rings 28 and 29 to retain the swivel parts 10 and 4;6 together against relative axial movement. The bore of the bearing rings 28 and 29 constitute bearing surfaces which are in close proximity with the corresponding peripheral surfaces of the swivel fitting part 10, thus to support the parts 10 and 4;6 for relative rotation. In the illustrated embodiment the housing 4;6 and cylinder 5 rotate with respect to the male swivel fitting part 10.

Another O-ring 40 in the housing part 6 makes sealed engagement with the swivel fitting part 10, said O-ring 40 being of diameter equal to the other two O-rings 30 so that when fluid under pressure is conducted into the head end of the cylinder 5 via the central passage 12 and radial passages 32 and the passages 8, the O-rings 30 and 40 will provide a pressure balanced seal so that there is no axial thrust tending to axially separate the swivel fitting parts 10 and 4;6.

Adjacent one O-ring 30 and O-ring 40 are drain chambers 41 and 42 into which fluid will leak in the event of leakage of either of said O-rings, and from which chambers 41 and 42 the fluid will be conducted to the reservoir 17 via the longitudinally extending passage 43 and radial passage 45, and drain port 46. The annular drain chamber 42 is sealed as by a low pressure squeeze type U-cup or lip packing ring 47 which is disposed in an internal groove in the housing part 6. Because the annular drain chamber 42 is communicated with the atmosphere there is never any high pressure fluid in the drain chamber 42 to act on the low pressure packing ring 47 and likewise, the drain chamber 41 at the end of the bore 21 is likewise vented to the atmosphere so that pressure cannot build up therein to tend to force the swivel fitting part 10 axially out of the swivel fitting housing 4;6.

When the reversing valve 16 is in the position shown, fluid under pressure will be conducted into the head end of the cylinder 5 to move the piston 9 toward the right as viewed in FIG. 1. By reason of pressure drop from counterbore 23 to passages 34, 36, and 35 fluid will be caused to flow through the passage 35 and through the radial and thrust bearing faces of the swivel part 10 and the rotating bearing ring 29 into the chamber 37 between the bearing rings 28 and 29 and from that chamber 37 through the orifice 38 into the passage 8. Fluid will also flow through the radial passage 34 and through the radial and thrust bearing faces of the swivel part 10 and the other bearing ring 28. In this way, the bearing surfaces of the swivel fitting are lubricated during the flow of fluid into the head end of the cylinder 5. Moreover, the pressure drop across the orifice 38 between the annular chamber 37 and the passage 8 tends to separate the bearing rings 28 and 29 so that there will not be any binding action of the bearing rings against the collar portion 39. With the reversing valve 16 in the position shown, the fluid displaced from the rod end of the cylinder 5 flows through the passages 20 and 7, through the peripheral groove 31 of the male swivel fitting part 10, and through the longitudinal passage 11 to the reservoir 17 via conduit 14, valve 16, and conduit 19.

When the valve 16 is moved to a position to reverse the movement of the piston 9 in the cylinder 5, fluid under pressure is conducted to the passage 11 and flows into the rod end of the cylinder 5 via the passage 11, peripheral groove 31 and passages 7 and 20, and the displaced fluid from the head end of the cylinder 5 flows through the passages 8 into the counterbore 23, through the radial passages 32, and through the central passage 12 to the reservoir 17 via conduit 15, valve 16, and conduit 19. Here again, the flowing fluid results in a pressure drop to cause flow of some fluid along the bearing surfaces to provide lubrication while the cylinder 5 and swivel fitting housing 4;6 is revolving with respect to the male swivel fitting part 10.

It is to be noted that in the case of a hydraulic actuator 1 flow of fluid is not necessary in order to provide for lubrication of the bearing surfaces of the bearing rings 28 and 29 because regardless of the position of the piston 9 in the cylinder 5 the passages 8 and 12 and the intervening passages and chambers will be filled with fluid.

I, therefore, particularly point out and distinctly claim as my invention:

1. A swivel fitting comprising axially interfitting relatively rotatable inner and outer members each having a pair of passages which are in fluid communication with a pair of chambers defined between said members for flow of fluid through said passages and chambers; sealing means between said members to prevent leakage from and between said chambers; said sealing means being effective to pressure balance said fitting so that fluid pressure in said passages and chambers is ineffective to impose relative axial forces between said members; and bearing means in another annular chamber defined between said members to support the latter for relative rotation and to retain them in axially interfitting relation; said another annular chamber having communication with upstream and downstream portions of a passage of one of said members to cause fluid flow through said another annular chamber to lubricate said bearing means.

2. The fitting of claim 1 wherein said chambers are axially spaced from each other; and wherein said sealing means comprises a plurality of sealing rings axially adjacent to and between said chambers.

3. The fitting of claim 1 wherein said bearing means comprises a pair of axially spaced apart bearing rings extending radially across said another annular chamber; said members having surfaces which radially overlap said bearing rings to retain the latter, and thus said members, against relative axial movement.

4. A swivel fitting comprising axially interfitting relatively rotatable inner and outer members each having a pair of passages which are in fluid communication with a pair of chambers respectively defined between a bore in said outer member and a peripheral groove around said inner member and between a counterbore in said outer member surrounding said inner member in radially spaced relation thereto for flow of fluid through said passages and chambers; sealing means between said members to prevent leakage from and between said chambers; said sealing means being effective to pressure balance said fitting so that fluid pressure in said passages and chambers is ineffective to impose relative axial forces between said members; and bearing means between said members to support the latter for relative rotation and to retain them in axially interfitting relation.

5. The fitting of claim 4 wherein said inner member has a vent passage leading to a drain chamber defined between the axially inner end of said inner member and the closed end of said bore in said outer member; said drain chamber being axially adjacent to the chamber defined between said bore and said peripheral groove to receive fluid which may leak past said sealing means.

6. The fitting of claim 5 wherein said members at the axially outer end of said outer member define therebetween another drain chamber axially outwardly adjacent to the other chamber to receive fluid which may leak past said sealing means; and another drain chamber having fluid communication with said vent passage to prevent buildup of fluid pressure in said another drain chamber; and low pressure sealing means between said members axially outwardly adjacent to said another drain chamber to prevent external leakage from said fitting.

7. The fitting of claim 5 wherein said bearing chamber has fluid communication with upstream and downstream portions of one of said pair of passages thus to lubricate said bearing means.

8. The fitting of claim 4 wherein said bearing means is exposed for lubrication by fluid in the chamber defined between said counterbore and said inner member.

9. The fitting of claim 4 wherein said inner member is cylindrical and is rotatably sealed by said sealing means in said bore in said outer member; said counter bore having a radially enlarged portion with said bearing means extending radially between said inner member and said enlarged portion.

10. The fitting of claim 4 wherein said members define therebetween an annular bearing chamber having axially spaced apart end walls and a radially outer wall in said outer member and a radially inner wall on said inner member; said bearing means comprising a pair of axially spaced apart bearing rings extending radially between said outer and inner walls and having oppositely facing end surfaces in juxtaposition to said end walls; said inner member having a radially projecting collar portion having end surfaces in juxtaposition to the end surfaces of said bearing rings which face each other whereby said members are supported by said bearing rings for relative rotation and are retained together by said bearing rings in axially interfitting relation.

11. A swivel fitting comprising axially interfitting relatively rotatable inner and outer members each having a pair of passages for flow of fluid between said members; said inner member having a cylindrical portion disposed in a bore in said outer member and defining therewith a pair of chambers in fluid communication with the respective passages for flow of fluid through said passages and chambers; sealing means between said cylindrical portion and said bore to prevent leakage from and between said chambers; said outer member having a larger bore radially spaced around said cylindrical portion; a bearing ring between said cylindrical portion and said larger bore journaling said members for relative rotation; said members having shoulders which radially overlap axially opposite sides of said bearing ring thus to retain said members together against axial separation; said larger bore having fluid communication with upstream and downstream portions of one of said passages for flow of fluid therethrough to lubricate the bearing surfaces of said bearing ring.

12. The fitting of claim 11 wherein another bearing ring is disposed between said cylindrical portion and said larger bore in axially spaced relation to said bearing ring to assist in journaling said members for relative rotation; said members having shoulders which radially overlap axially opposite sides of said another bearing ring thus to prevent axial inward movement of said inner member in said outer member.

13. A swivel fitting comprising a first outer member having a bore with a closed end and first and second counterbores, and a pair of fluid passages respectively intersecting said bore and first counterbore; a second outer member secured to said first outer member and having a through bore which is axially spaced from and aligned with the bore of said first outer member and a counterbore which is a continuation of said second counterbore; a first bearing ring in the counterbore of said second outer member adjacent the bottom of said counterbore; a second bearing ring in said second counterbore adjacent the bottom thereof and projecting axially into the counterbore of said second outer member to constitute pilot means to locate said outer members coaxially with respect to each other; and inner member extending axially through the bore of said second outer member, through said bearing rings to support said inner member and said first and second outer members for relative rotation, and into the bore of said first outer member; said inner member having a collar portion disposed between said bearing rings in radially overlapped relation thereto to retain said inner member in axially interfitting relation in said first and second outer members; said inner member having a pair of fluid passages respectively communicating with a pair of passages in said first outer member in all relative rotary positions; and sealing means between said inner member and the bores of said first and second outer members to prevent leakage of fluid from and between said passages.

14. The fitting of claim 13 wherein said sealing means comprises a plurality of sealing rings of equal diameter to pressure balance said fitting so that fluid pressure in said passages is ineffective to impose relative axial forces between said inner member and said first and second outer members.

15. The fitting of claim 13 wherein said inner member has a vent passage leading to a drain chamber defined between the axially inner end of said inner member and the closed end of the bore in said first outer member to prevent buildup of fluid pressure in said drain chamber due to leakage of fluid past said sealing means.

16. The fitting of claim 13 wherein said first outer member constitutes the cylinder head of a double-acting fluid motor with said pair of passages respectively leading to the opposite ends of the motor.

17. The fitting of claim 13 wherein said bearing rings are exposed to fluid in the passages leading to said first counterbore thus to lubricate the bearing surfaces thereof.

18. The fitting of claim 13 wherein one of said passages in said inner member extends axially and thence radially to said first counterbore and has axially spaced apart radial passages leading to the radially inner bearing surfaces of said first and second bearing rings for flow of fluid to lubricate the bearing surfaces of said bearing rings and said inner member.

19. The fitting of claim 18 wherein said one of said passages in said inner member has another radial passage leading into the counterbore of said second outer member for lubrication of the axial thrust bearing surfaces of said collar portion and said bearing rings.

* * * * *